United States Patent
Sato

(10) Patent No.: US 8,891,124 B2
(45) Date of Patent: Nov. 18, 2014

(54) PRINTING APPARATUS, DATA CONTROL METHOD THEREIN, AND STORAGE MEDIUM STORING PROGRAM

(75) Inventor: Yukimasa Sato, Kawasaki (JP)

(73) Assignee: Canon Kabushiki Kaisha (JP)

( * ) Notice: Subject to any disclaimer, the term of this patent is extended or adjusted under 35 U.S.C. 154(b) by 188 days.

(21) Appl. No.: 13/530,184

(22) Filed: Jun. 22, 2012

(65) Prior Publication Data

US 2012/0327474 A1 Dec. 27, 2012

(30) Foreign Application Priority Data

Jun. 23, 2011 (JP) ................. 2011-139859

(51) Int. Cl.
*G06K 15/00* (2006.01)
*G06K 15/02* (2006.01)
*G06F 3/12* (2006.01)

(52) U.S. Cl.
CPC ........ *G06K 15/1886* (2013.01); *G06K 15/1806* (2013.01); *G06K 15/1822* (2013.01)
USPC ........ 358/1.16; 358/1.13; 358/1.14; 358/1.15

(58) Field of Classification Search
CPC .......... G06K 15/1817; G06K 15/1821; G06K 15/1823; G06K 15/1886; G06K 15/1806; G06K 15/1822; G06F 3/1274; G06F 3/1295
See application file for complete search history.

(56) References Cited

U.S. PATENT DOCUMENTS

| 5,890,820 A | 4/1999 | Handa |
| 6,070,960 A | 6/2000 | Nakajima |
| 6,089,765 A * | 7/2000 | Mori ............................ 400/61 |
| 8,085,411 B2 | 12/2011 | Kai et al. |
| 2008/0158624 A1* | 7/2008 | Hayashi ....................... 358/498 |
| 2011/0122436 A1 | 5/2011 | Ogushi |

FOREIGN PATENT DOCUMENTS

| CN | 1152499 A | 6/1997 |
| CN | 1581056 A | 2/2005 |
| JP | 6-31907 A | 2/1994 |
| JP | 10171617 A | 6/1998 |
| JP | 11-105381 A | 4/1999 |
| JP | 2011-110808 A | 6/2011 |

OTHER PUBLICATIONS

Office Action issued in Chinese Patent Application No. 201210205349, dated Sep. 4, 2014. English translation provided.

* cited by examiner

*Primary Examiner* — Dov Popovici
(74) *Attorney, Agent, or Firm* — Rossi, Kimms & McDowell LLP

(57) ABSTRACT

A printing apparatus prints based on print data in the first state if printing is executable in the first state, and prints based on the print data in the second state different from the first state if printing is not executable in the first state. When deleting print data which meets a predetermined condition, the printing apparatus specifies print data which meets the predetermined condition, among print data which has been printed in the first state.

12 Claims, 11 Drawing Sheets

PRINTING APPARATUS, DATA CONTROL METHOD THEREIN, AND STORAGE MEDIUM STORING PROGRAM

BACKGROUND OF THE INVENTION

1. Field of the Invention

The present invention relates to a printing apparatus which reprints, a data control method therein, and a storage medium storing a program.

2. Description of the Related Art

There is known reprint (reprinting) processing in which print data is saved in a printing apparatus and can be reprinted without transmitting the print data again from a PC. In reprint processing, the printing apparatus sequentially accumulates stored print data. When the total amount of saved print data exceeds the storage capacity, print data are sequentially deleted from older data to ensure a free capacity.

Some print data are force-printed upon data reception. For example, when no letter sheet exists in the printing apparatus, print data designated to be printed on a letter sheet is printed on an A4 sheet instead. As another case, while the remaining toner amount is small and a warning appears, printing is executed without toner replenishment. In this case, if the user determines that the printing result is not satisfactory, he sets letter sheets in the printing apparatus or replenishes toner, and then prints again. For this reason, force-printed print data is highly likely to be reprinted, compared to print data saved for normal reprinting. Also, the user has moved to the apparatus installation location to get a printing result, replenish sheets, or change toner. In reprinting, the user often uses the reprint function capable of designating printing from the printing apparatus.

In secure print in which print data is temporarily saved in a printing apparatus and can be printed after user authentication, the print data saved in the printing apparatus after printing is generally discarded after printing. However, when forced printing occurs, the user is highly likely to reprint even in secure print. This also applies to copying when image data is temporarily saved in preparation for reprinting.

In general, when the free capacity of the storage area runs short, data saved for reprinting are sequentially deleted from older print data, as described in Japanese Patent Laid-Open No. 10-171617. However, in the method of deleting print data from older one, even print data which is highly likely to be reprinted are deleted from older one, similar to other print data. In reprinting, the print data may have already been deleted.

SUMMARY OF THE INVENTION

An aspect of the present invention is to eliminate the above-mentioned problems with the conventional technology. The present invention provides a printing apparatus which reduces the situation in which print data has already been deleted in reprinting, a data control method in the printing apparatus, and a storage medium storing a program.

The present invention in its first aspect provides a printing apparatus capable of reprinting based on print data stored in a storage unit after printing based on the print data, comprising: a printing unit configured to, if printing is executable in a first state, print based on the print data in the first state, and if printing is not executable in the first state, print based on the print data in a second state different from the first state; a specifying unit configured to specify, in accordance with a predetermined condition to specify print data to be deleted, print data which meets the predetermined condition, among print data which is stored in the storage unit and has been printed in the first state; and a deletion unit configured to delete the print data specified by the specifying unit.

The present invention in its second aspect provides a printing apparatus capable of reprinting based on print data stored in a storage unit after printing based on the print data, comprising: a capacity determination unit configured to determine whether or not a free capacity of the storage unit is not larger than a threshold; a first determination unit configured to, when the capacity determination unit determines that the free capacity is not larger than the threshold, determine whether or not print data stored earliest out of print data stored in the storage unit is force-printed data which was force-printed in accordance with a setting different from a designated setting; a first deletion unit configured to, when the first determination unit determines that the print data stored earliest is not the force-printed data, delete the print data stored earliest; a second determination unit configured to, when the first determination unit determines that the print data stored earliest is the force-printed data, determine whether or not all print data stored in the storage unit are the force-print data; and a second deletion unit configured to, when the second determination unit determines that all the print data are the force-printed data, delete the print data stored earliest, and when the second determination unit determines that not all the print data are the force-printed data, delete print data stored earliest out of print data which are not the force-printed data.

The present invention in its third aspect provides a data control method to be executed in a printing apparatus capable of reprinting based on print data stored in a storage unit after printing based on the print data, comprising: a printing step of, if printing is executable in a first state, printing based on the print data in the first state, and if printing is not executable in the first state, printing based on the print data in a second state different from the first state; a specifying step of specifying, in accordance with a predetermined condition to specify print data to be deleted, print data which meets the predetermined condition, among print data which is stored in the storage unit and has been printed in the first state; and a deletion step of deleting the specified print data.

The present invention in its fourth aspect provides a data control method to be executed in a printing apparatus capable of reprinting based on print data stored in a storage unit after printing based on the print data, comprising: a capacity determination step of determining whether or not a free capacity of the storage unit is not larger than a threshold; a first determination step of, when the free capacity is determined in the capacity determination step not to be larger than the threshold, determining whether or not print data stored earliest out of print data stored in the storage unit is force-printed data which was force-printed in accordance with a setting different from a designated setting; a first deletion step of, when the print data stored earliest is determined in the first determination step not to be the force-printed data, deleting the print data stored earliest; a second determination step of, when the print data stored earliest is determined in the first determination step to be the force-printed data, determining whether or not all print data stored in the storage unit are the force-printed data; and a second deletion step of, when all the print data are determined in the second determination step to be the force-printed data, deleting print data stored earliest, and when not all the print data are determined in the second determination step to be the force-printed data, deleting print data stored earliest out of print data which are not the force-printed data.

The present invention in its fifth aspect provides a computer-readable storage medium storing a program for causing a computer to execute a printing step of, if printing is executable in a first state, printing based on print data in the first state, and if printing is not executable in the first state, printing based on the print data in a second state different from the first state, a specifying step of specifying, in accordance with a predetermined condition to specify print data to be deleted, print data which meets the predetermined condition, among print data which is stored in a storage unit, and a deletion step of deleting the specified print data.

The present invention in its sixth aspect provides a computer-readable storage medium storing a program for causing a computer to execute a capacity determination step of determining whether or not a free capacity of a storage unit is not larger than a threshold, a first determination step of, when the free capacity is determined in the capacity determination step not to be larger than the threshold, determining whether or not print data stored earliest out of print data stored in the storage unit is force-printed data which was force-printed in accordance with a setting different from a designated setting, a first deletion step of, when the print data stored earliest is determined in the first determination step not to be the force-printed data, deleting the print data stored earliest, a second determination step of, when the print data stored earliest is determined in the first determination step to be the force-printed data, determining whether or not all print data stored in the storage unit are the force-printed data, and a second deletion step of, when all the print data are determined in the second determination step to be the force-printed data, deleting print data stored earliest, and when not all the print data are determined in the second determination step to be the force-printed data, deleting print data stored earliest out of print data which are not the force-printed data.

The present invention can reduce the situation in which print data has already been deleted in reprinting.

Further features of the present invention will become apparent from the following description of exemplary embodiments with reference to the attached drawings.

DESCRIPTION OF THE EMBODIMENTS

Figure 1:
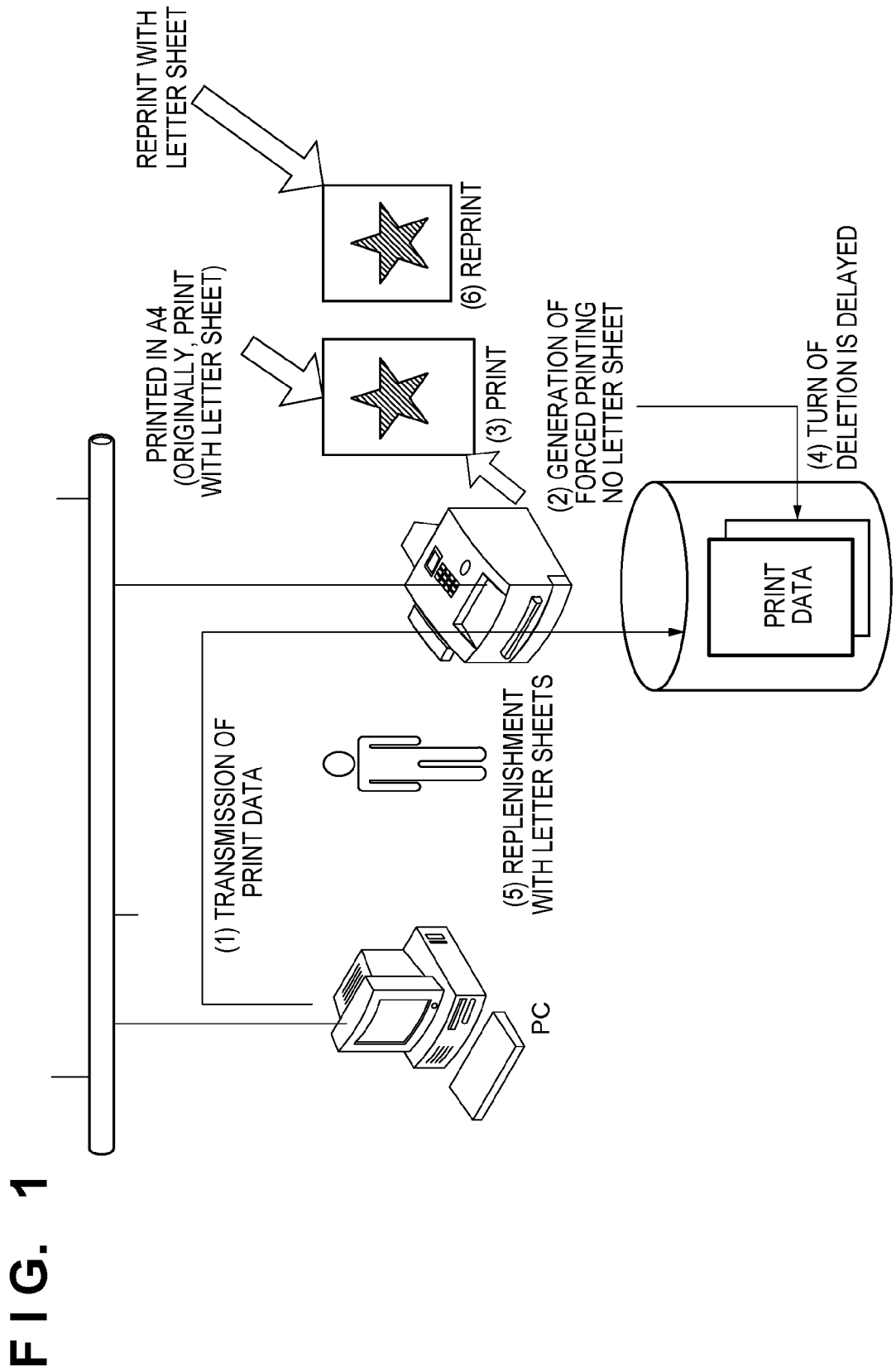
FIG. 1 is a view for explaining print processing when forced printing occurs.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

First Embodiment

FIG. 1 is a view for explaining print processing when forced printing occurs in the embodiment. A case in which printing with a letter sheet is designated, but no letter sheet exists in a printing apparatus, and print data is force-printed on an A4 sheet will be explained. After a PC transmits print data in accordance with a print instruction by a user (1), the printing apparatus determines that no designated letter sheet exists in the printing apparatus (2). Then, the printing apparatus force-prints print data on, for example, an A4 sheet (3). The user goes to the printing apparatus and gets the printed material, or confirms the printing result on the PC, and knows that printing was done on the A4 sheet. The print data is saved in the printing apparatus for reprinting (reprint). In the embodiment, the turn at which print data (force-printed data) having undergone forced printing is deleted is delayed (4). After the user sets letter sheets in the printing apparatus (5), the printing apparatus reprints the saved print data (6). In the embodiment, when forced printing is executed, the turn at which print data is deleted is delayed so that the print data is hardly deleted even upon receiving the next print data. The embodiment can reduce the situation in which the print data cannot be reprinted.

Figure 2:
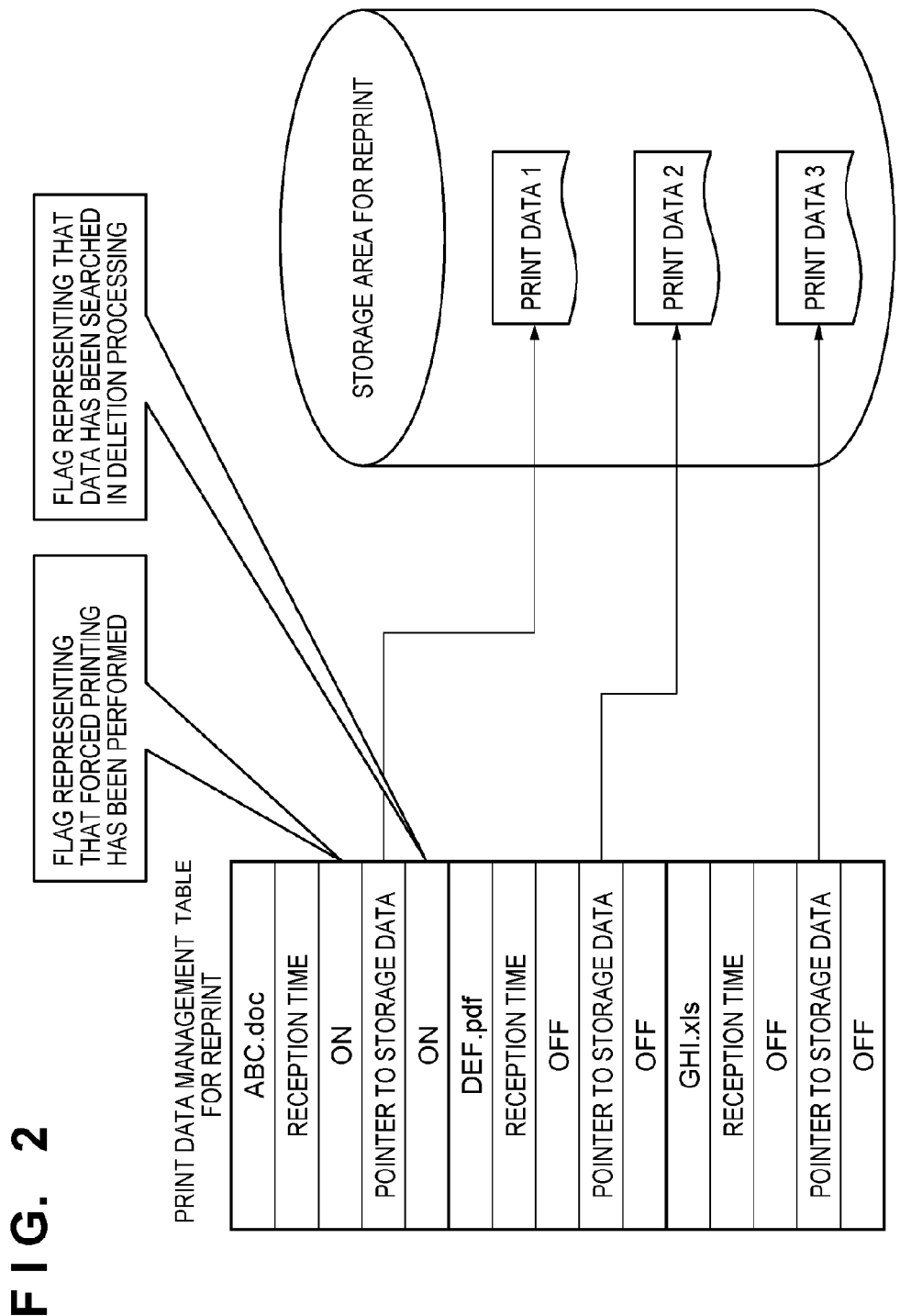
FIG. 2 is a view showing print data for reprint saved for reprint.

FIG. 2 is a view showing print data saved for reprint. Print data for reprint is stored in the internal storage area of the printing apparatus, and managed by a print data management table for reprint. The print data management table contains a print data name and the time when print data was received. The print data management table also contains a flag (forced print flag) representing whether forced printing has been performed, a pointer to a print data storage destination, and a flag (search completion flag) representing whether print data has already been searched once when determining print data to be deleted. The forced print flag is set ON when forced printing has been performed. The search completion flag is set ON when print data has been searched but not deleted because the forced print flag is ON. The search completion flag is used to determine whether all stored data have been searched, which will be described later.

Figure 3:
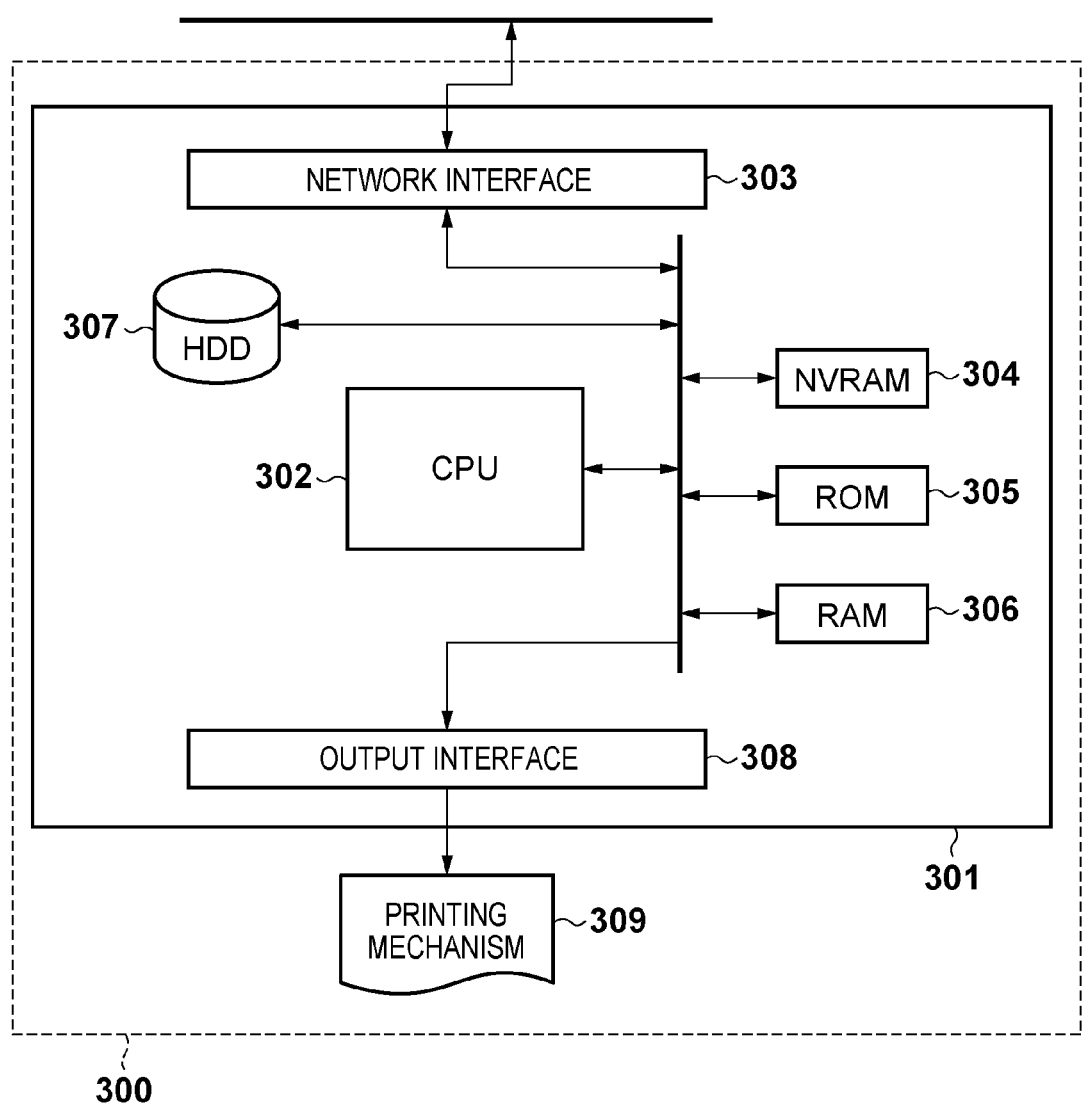
FIG. 3 is a block diagram showing the schematic arrangement of the control unit of a printing apparatus.

FIG. 3 is a block diagram showing the schematic arrangement of the control unit of a printing apparatus. The printing apparatus in the embodiment can reprint based on stored print data after printing based on the print data. A main body 301 is the main body of the controller board of a printing apparatus 300. A series of processing procedures in the printing apparatus 300 is stored as a program in a ROM 305 or hard disk 307, and implemented by reading out and executing the program by a CPU 302. A network interface 303 performs network communication with the outside. PDL data is communicated via the network interface 303. The network interface 303 can perform encrypted communication with an external apparatus. An NVRAM 304 is a nonvolatile memory such as an EEPROM. The NVRAM 304 stores panel set values designated on an operation panel (not shown). A RAM 306 is used as a storage area in execution by the CPU 302. When the hard disk 307 stores an operation program, the CPU 302 expands the program in the RAM and executes it. The hard disk 307 stores print data, programs for operating the printing apparatus 300, and the like. The print data management table for reprint shown in FIG. 2 is stored in the RAM 306 or hard disk 307. The storage area shown in FIG. 2 is ensured in the RAM 306 or hard disk 307. To reprint print data even after the printing apparatus 300 is turned off, the print data management table is stored in the hard disk 307 and the storage area is ensured in the hard disk 307. An output interface 308 is an interface with a printing mechanism 309 which prints, such as a printhead.

Figure 4:
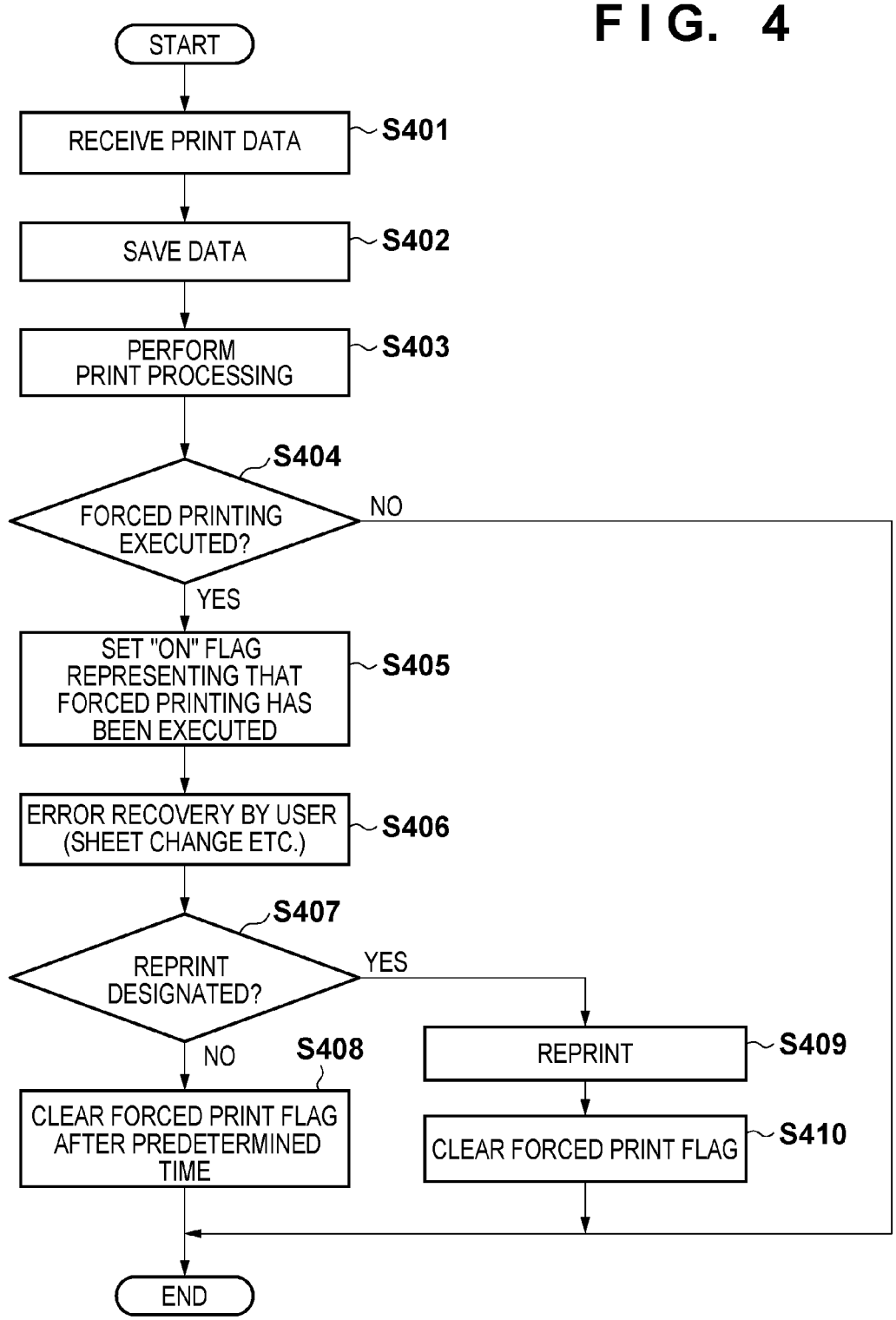
FIG. 4 is a flowchart showing the sequence of reprint processing.

FIG. 4 is a flowchart showing the sequence of reprint processing in the embodiment. Respective steps shown in FIG. 4 are executed by, for example, the CPU 302 of the printing apparatus 300. The CPU 302 receives print data from an external PC or the like (step S401). The CPU 302 then saves the received print data in the storage area, and registers it in the print data management table shown in FIG. 2 (step S402). Then, the CPU 302 performs print processing based on the received print data (step S403). The CPU 302 determines whether forced printing has been executed during print processing (step S404). Forced printing is printing at a setting different from a designated one when printing at the designated setting is impossible. For example, a letter sheet is designated, but no letter sheet exists in the printing apparatus, and thus print data is printed on an A4 sheet. If the CPU 302 determines that forced printing has been executed, it sets the forced print flag ON for print data registered in the print data management table shown in FIG. 2 (step S405). Then, the user performs error recovery processing. In the embodiment, for example, the user replenishes letter sheets. The CPU 302 detects that error recovery processing has been performed (step S406). After that, the CPU 302 determines whether the user has issued a reprint instruction (step S407). If the CPU 302 determines that the user has issued a reprint instruction, it performs reprint processing using the saved print data (step S409). After the end of reprint processing, the CPU 302 sets OFF the forced print flag corresponding to the reprint-designated print data (step S410). If the user has not issued a reprint instruction within a predetermined time, the CPU 302 sets the forced print flag OFF (step S408).

Figure 5:
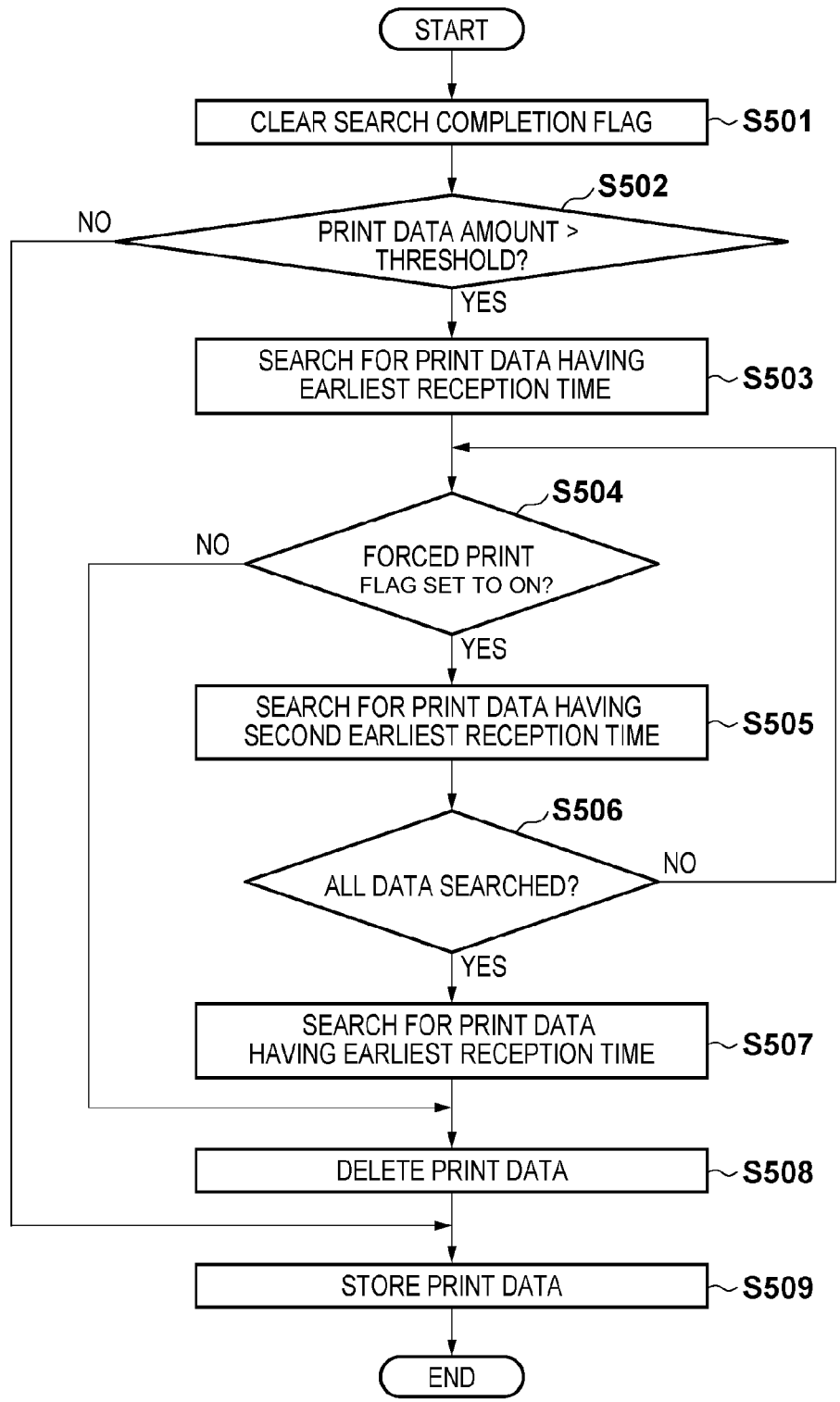
FIG. 5 is a flowchart showing the sequence of print data save processing.

FIG. 5 is a flowchart showing the sequence of print data save processing (data control processing) in the embodiment. FIG. 5 corresponds to step S402 of FIG. 4. Respective steps shown in FIG. 5 are executed by, for example, the CPU 302 of the printing apparatus 300. The CPU 302 sets the search completion flag OFF for each print data in the print data management table (step S501). The CPU 302 determines whether the amount of print data saved in the storage area will exceed a predetermined threshold when received print data is saved in the storage area (step S502). If the CPU 302 determines that the print data amount will exceed the predetermined threshold, it searches the print data management table for (past) print data having the earliest reception time (step S503). Then, the CPU 302 determines which of ON and OFF is set in the forced print flag for the print data specified by search (step S504). If the CPU 302 determines that the forced print flag is OFF, it deletes the print data specified by search (step S508). After the print data is deleted, the CPU 302 stores the print data received in step S401 in the storage area which becomes free upon deletion of the old print data (step S509). If the CPU 302 determines in step S502 that the amount is equal to or smaller than the threshold, it stores the print data received in step S401 in the storage area (step S509). In step S509, the print data is also registered in the print data management table shown in FIG. 2.

If the CPU 302 determines in step S504 that the forced print flag is ON, it sets the search completion flag ON for the print data, and searches for print data having the second earliest reception time (step S505). The CPU 302 determines whether all print data have been searched (step S506). If the search completion flags are ON for all print data, it is determined that all the print data have been searched. If the CPU 302 determines that not all print data have been searched, it performs processing in step S504 for the print data specified in step S505. If the CPU 302 determines that all print data have been searched, it searches again for print data having the earliest reception time (step S507). Re-search processing may be omitted by separately setting a flag for print data having the earliest reception time in the first search, or storing an address in the print data management table for print data having the earliest reception time. The CPU 302 deletes the print data specified in step S507 (step S508). In this case, force-printed print data is deleted. If the CPU 302 determines in step S504 that the forced print flag is OFF, it deletes the print data specified in step S505 (step S508). In this case, print data for which the forced print flag is OFF is deleted.

As described above, in the embodiment, when print data which was force-printed and is stored in the storage area is the oldest print data in the print history, and the second oldest print data in the print history has not been force-printed, the oldest print data is not deleted. Therefore, the embodiment can reduce the situation in which, when reprinting force-printed print data, the print data has already been deleted.

Second Embodiment

Figure 6:
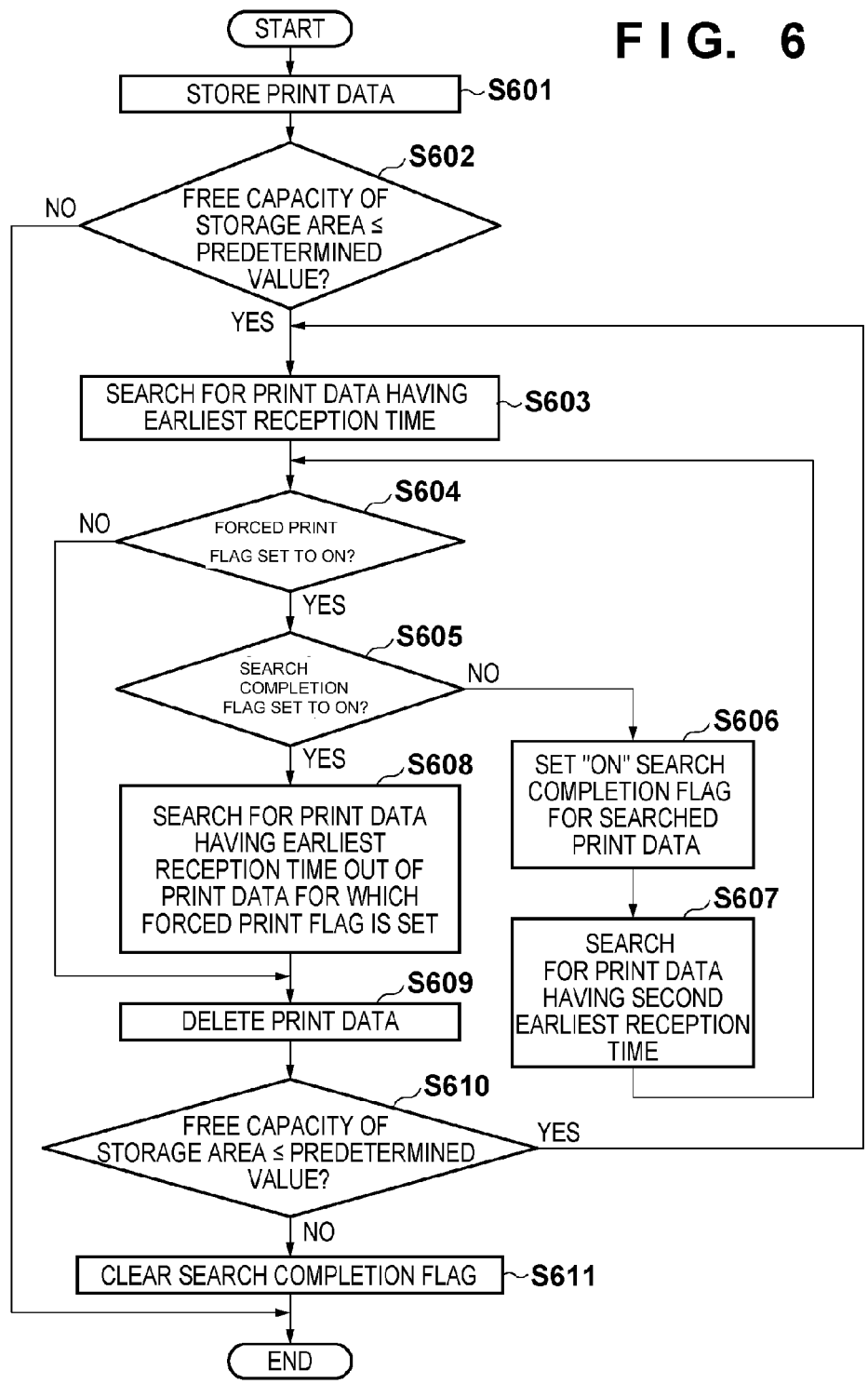
FIG. 6 is a flowchart showing the sequence of print data deletion processing.

FIG. 6 is a flowchart showing the sequence of print data deletion processing in the embodiment. In FIG. 6, print data deletion processing is performed when the free capacity of the storage area becomes equal to or smaller than a predetermined value after storing print data in the storage area. FIG. 6 corresponds to step S402 of FIG. 4. Respective steps shown in FIG. 6 are executed by, for example, a CPU 302 of a printing apparatus 300. First, the CPU 302 stores received print data in the storage area (step S601). In step S601, the print data is also registered in the print data management table. The CPU 302 determines whether the free capacity of the storage area is equal to or smaller than a predetermined value (step S602). If the CPU 302 determines that the free capacity of the storage area is larger than the predetermined value, the process ends.

If the CPU 302 determines that the free capacity of the storage area is equal to or smaller than the predetermined value, it searches the print data management table for print data having the earliest reception time (step S603). The CPU 302 determines which of ON and OFF is set in the forced print flag for the print data specified by search (step S604). If the CPU 302 determines that the forced print flag is OFF, it deletes the print data specified by search (step S609). After the print data is deleted, the CPU 302 determines whether the free capacity of the storage area is equal to or smaller than the predetermined value (step S610). If the CPU 302 determines that the free capacity of the storage area is equal to or smaller than the predetermined value, the process returns to step S603. If the CPU 302 determines that the free capacity of the storage area is larger than the predetermined value, it sets the search completion flag OFF for each print data in the print data management table (step S611).

If the CPU 302 determines in step S604 that the forced print flag is ON, it determines which of ON and OFF is set in the search completion flag for the print data specified by search (step S605). If the CPU 302 determines that the search completion flag is OFF, it sets the search completion flag ON for the print data (step S606). Then, the CPU 302 searches for print data having the second earliest reception time (step S607), and performs processing in step S604.

If the CPU 302 determines in step S605 that the search completion flag is ON, it searches force-printed print data for print data having the earliest reception time (step S608). In FIG. 6, the predetermined value in step S602 and that in step S610 may be equal, or the predetermined value in step S610 may be larger. If these two values are equal, many print data can be saved. However, when the next print data comes, the next deletion processing may be executed quickly. To the contrary, when the predetermined value in step S610 is larger, a long time can be ensured until the next deletion processing is performed.

Third Embodiment

Even in secure print, if print data is force-printed, it is highly likely to be reprinted. Hence, the print data is saved for a predetermined time or till reprinting, or the user is prompted to designate whether to delete the print data.

Figure 7:
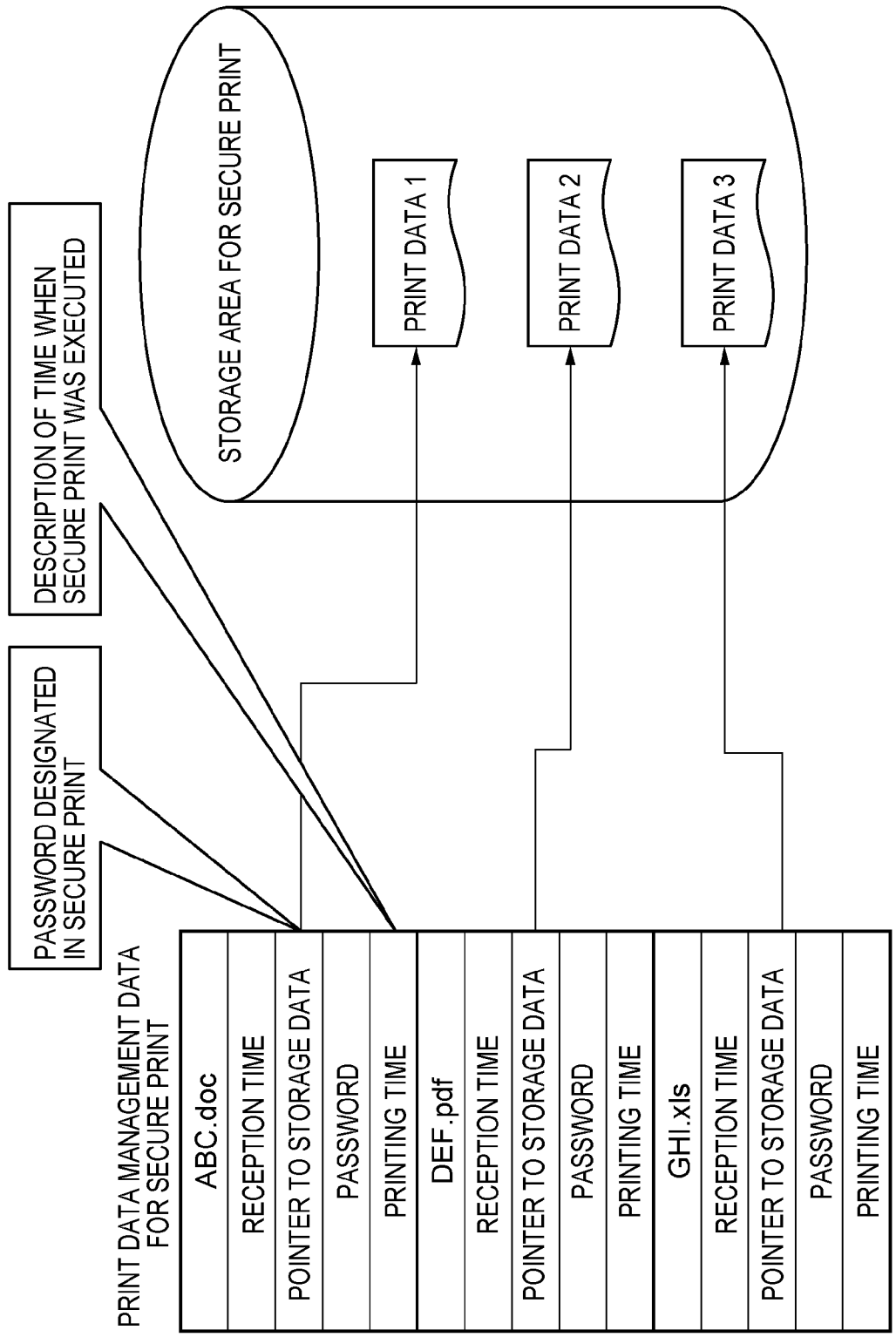
FIG. 7 is a view showing print data for secure print that is saved in a storage area.

FIG. 7 is a view showing print data for secure print that is saved in the storage area. Print data for secure print is stored in the internal storage area of a printing apparatus 300, and managed by a print data management table for secure print. The print data management table contains a print data name, a reception time, a pointer to a print data storage destination, a password, and the time when print data was actually printed. Print data is encrypted and stored in the storage area.

Figure 8:
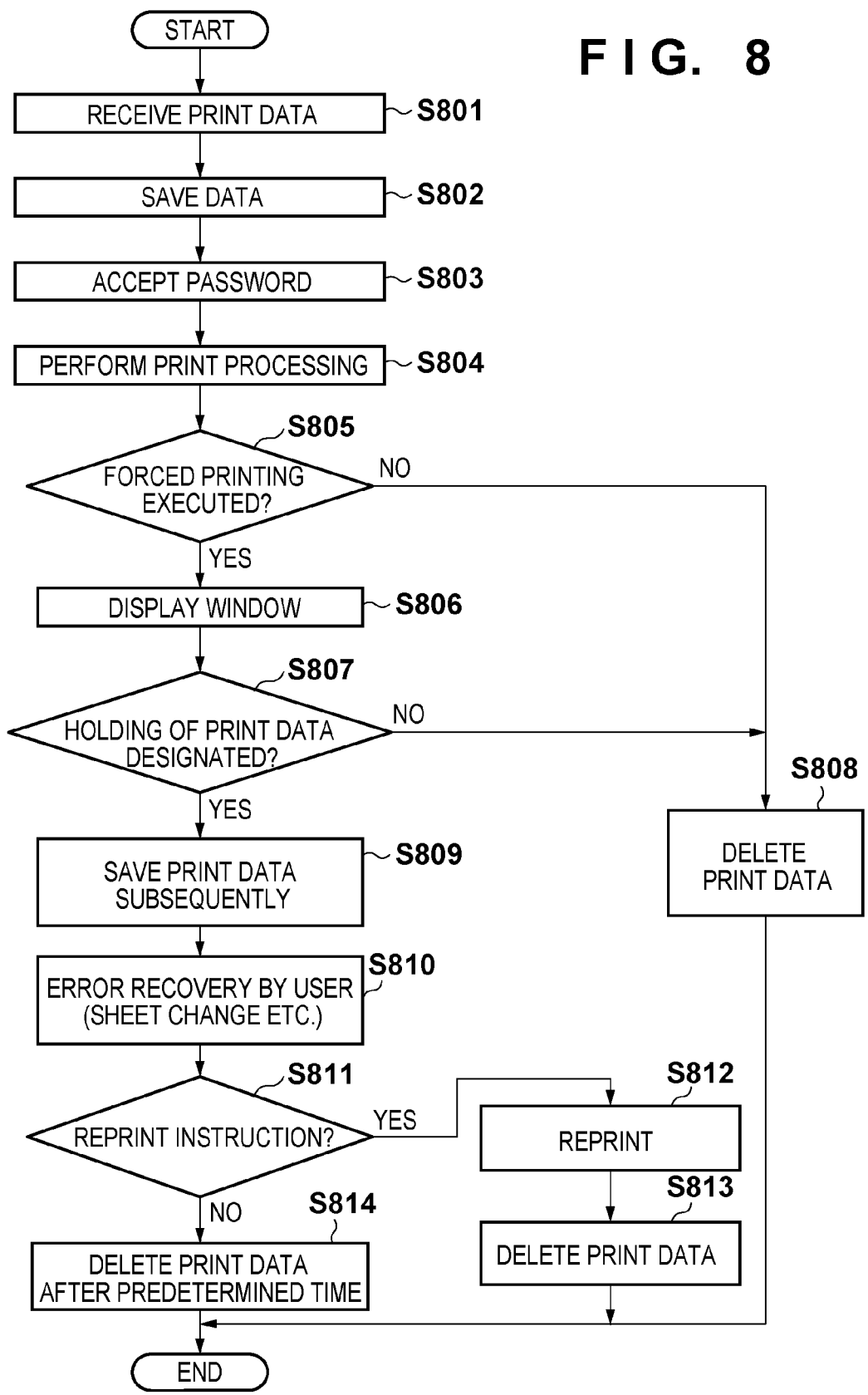
FIG. 8 is a flowchart showing the sequence of secure print processing.

FIG. 8 is a flowchart showing the sequence of secure print processing in the embodiment. Respective steps shown in FIG. 8 are executed by, for example, a CPU 302 of the printing apparatus 300. First, the CPU 302 receives print data for secure print from an external PC or the like (step S801). Then, the CPU 302 saves the received print data in the storage area shown in FIG. 7, and registers it in the print data management table shown in FIG. 7 (step S802). The CPU 302 accepts a password from the user (step S803).

The CPU 302 performs secure print processing in accordance with the accepted password (step S804), and determines whether the print data was force-printed during print processing (step S805). If the CPU 302 determines that the print data was not force-printed, it deletes the print data from the storage area shown in FIG. 7 after the end of printing (step S808). If the CPU 302 determines that the print data was force-printed, it displays a window which prompts the user to designate whether to hold the print data (step S806).

The CPU 302 determines whether it has accepted the instruction from the user to hold the print data (step S807). If the CPU 302 determines that it has not accepted the instruction from the user to hold the print data, the process advances to step S808. If the CPU 302 determines that it has accepted the instruction from the user to hold the print data, it displays a message representing save of the print data without deleting the print data (step S809).

After that, the user performs error recovery processing. In the embodiment, for example, the user replenishes letter sheets. The CPU 302 detects that error recovery processing has been performed (step S810). The CPU 302 determines whether the user has issued a reprint instruction (step S811). If the CPU 302 determines that the user has issued a reprint instruction, it performs reprint processing (step S812). After the end of reprint, the CPU 302 deletes the print data from the storage area shown in FIG. 7 (step S813). If the CPU 302 determines that the user has not issued a reprint instruction within a predetermined period, it deletes the print data from the storage area shown in FIG. 7 (step S814). In reprint processing, the user may be prompted to enter the password again.

Fourth Embodiment

In copying, image data is sometimes saved not to scan it twice. In this case, image data is managed in the print data management table shown in FIG. 2. In the fourth embodiment, the reception time in FIG. 2 is rewritten into the storage time. A CPU 302 registers, as the storage time in the print data management table, the time when image data was stored in the storage area. In copying, sheet change is designated at the start of copying, and reprinting is rare. However, when a printing material such as toner or ink runs short (to be referred to as toner LOW) and, for example, the copying result fades, reprinting may be executed.

Figure 9:
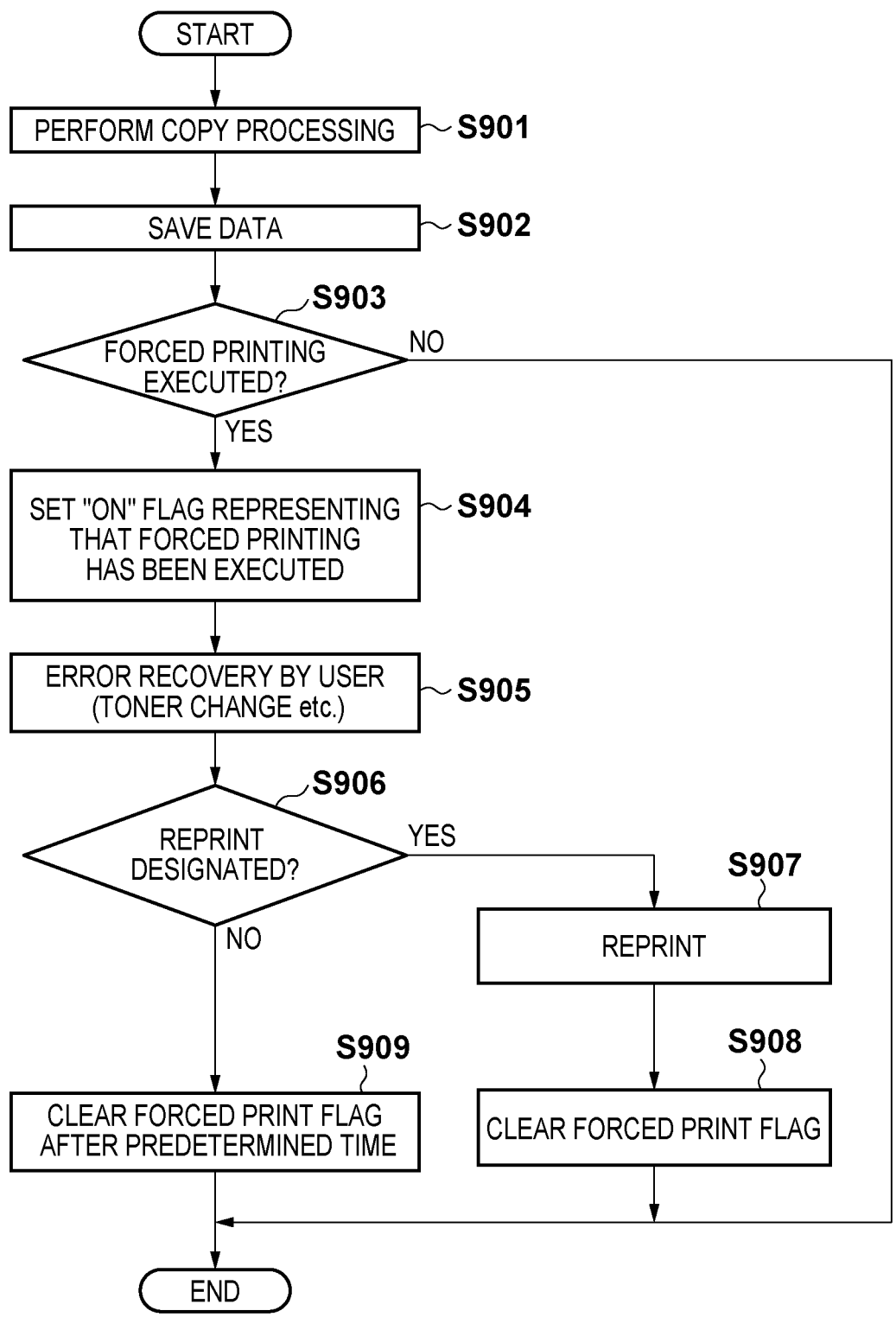
FIG. 9 is a flowchart showing the sequence of copy processing.

FIG. 9 is a flowchart showing the sequence of copy processing in the embodiment. Respective steps shown in FIG. 9 are executed by, for example, the CPU 302 of a printing apparatus 300. First, the CPU 302 executes copy processing (step S901). In copy processing, the CPU 302 controls a scanner, not shown in FIG. 3, to scan image data, and controls a printing mechanism 309 to print the scanned image data. The CPU 302 saves the scanned image data in the storage area shown in FIG. 2, and registers it in the print data management table shown in FIG. 2 (step S902). The CPU 302 determines whether forced printing has been performed while toner LOW is displayed during copy processing (step S903). If the CPU 302 determines that no forced printing has been performed, the process ends. If the CPU 302 determines that forced printing has been performed, it sets the forced print flag ON for the image data registered in the print data management table shown in FIG. 2 (step S904).

Then, the user performs error recovery processing. In the embodiment, for example, the user replenishes toner. The CPU 302 detects that error recovery processing has been performed (step S905). The CPU 302 determines whether the user has issued a reprint instruction (step S906). If the CPU 302 determines that the user has issued a reprint instruction, it performs reprinting using the saved image data (step S907), and sets OFF the forced print flag corresponding to the reprinting-designated image data (step S908). If the CPU 302 determines that the user has not issued a reprint instruction, it sets the forced print flag OFF after a predetermined period (step S909).

Figure 10:
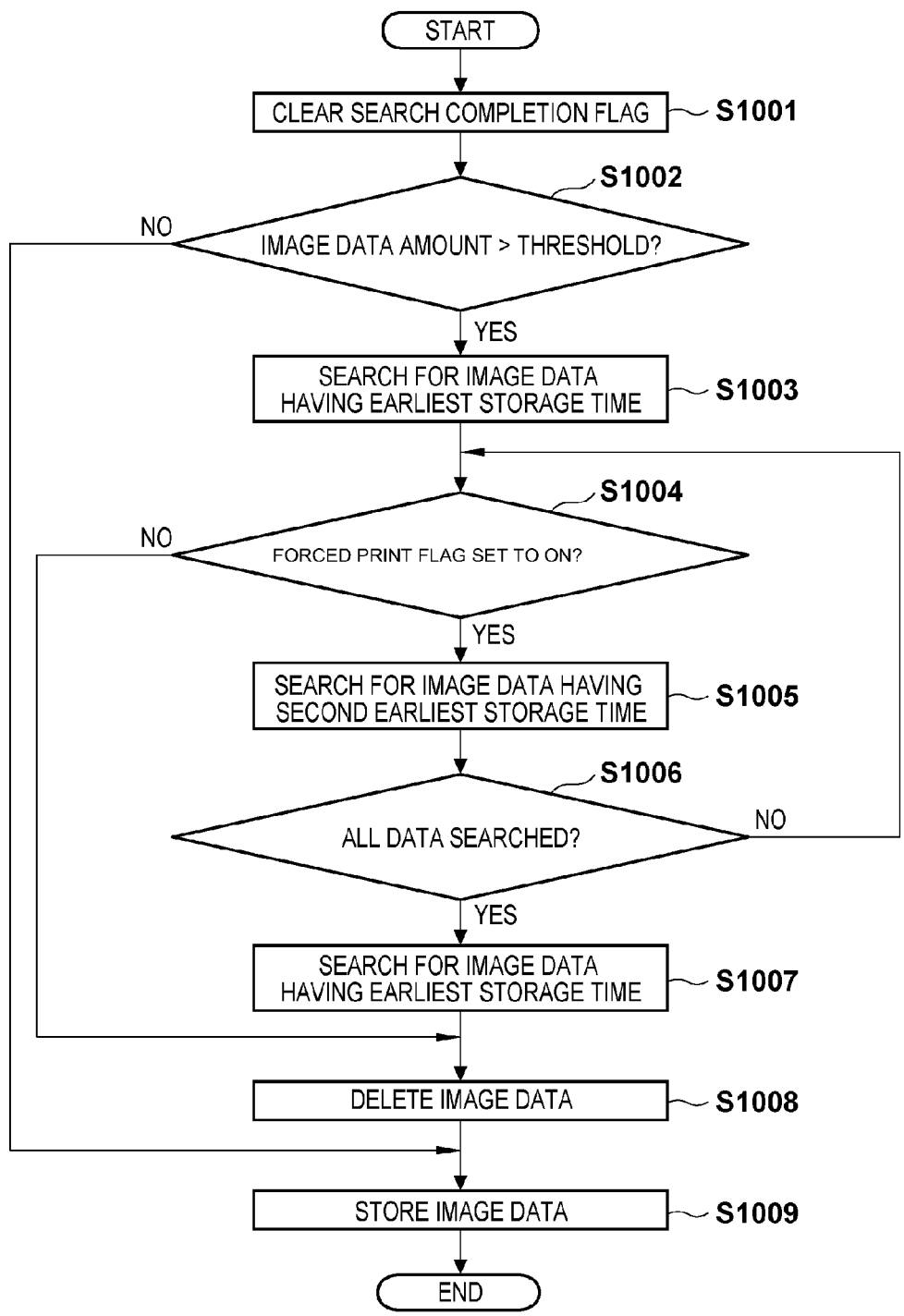
FIG. 10 is a flowchart showing the sequence of image data save processing.

FIG. 10 is a flowchart showing the sequence of image data save processing in the embodiment. FIG. 10 corresponds to step S902 of FIG. 9. Respective steps shown in FIG. 10 are executed by, for example, the CPU 302 of the printing apparatus 300. The CPU 302 sets the search completion flag OFF for each image data in the print data management table (step S1001). The CPU 302 determines whether the amount of image data saved in the storage area will exceed a predetermined threshold when scanned image data is saved in the storage area (step S1002). If the CPU 302 determines that the image data amount will exceed the threshold, it searches the print data management table for image data having the earliest storage time (step S1003). Then, the CPU 302 determines which of ON and OFF is set in the forced print flag for the image data specified by search (step S1004). If the CPU 302 determines that the forced print flag is OFF, it deletes the image data specified by search (step S1008), and stores image data scanned by current copy processing in a free storage area (step S1009). In step S1009, the image data is also registered in the print data management table shown in FIG. 2. If the CPU 302 determines that the forced print flag is ON, it searches for image data having the second earliest storage time (step S1005). The CPU 302 determines whether all image data have been searched (step S1006). If the CPU 302 determines that not all image data have been searched, it performs processing in step S1004 for the image data specified in step S1005. If the CPU 302 determines that all image data have been searched, it searches again for image data having the earliest storage time (step S1007). Re-search processing may be omitted by separately setting a flag for image data having the earliest storage time in the first search, or storing an address in the print data management table for image data having the earliest storage time.

Fifth Embodiment

Figure 11:
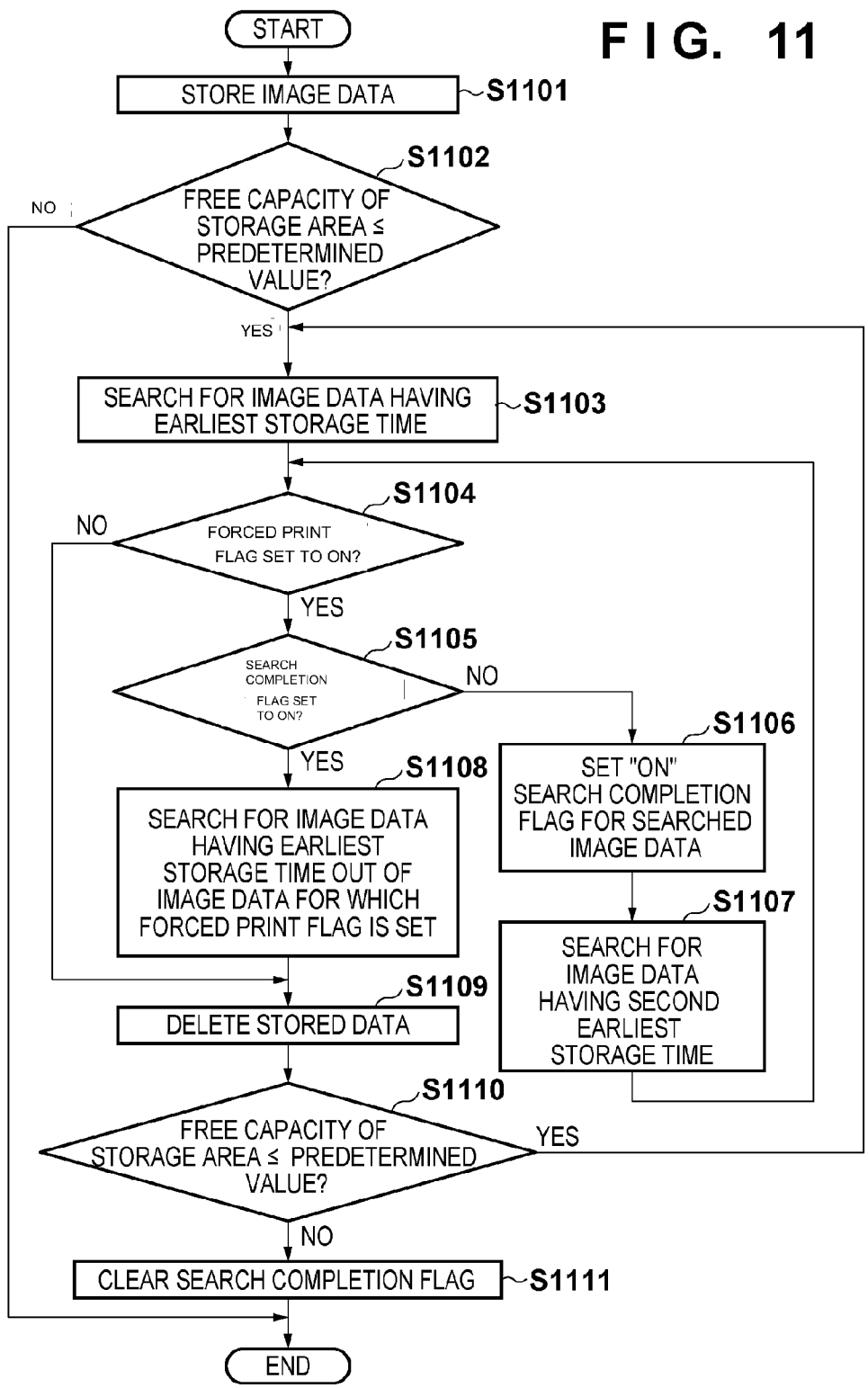
FIG. 11 is a flowchart showing the sequence of image data deletion processing.

FIG. 11 is a flowchart showing the sequence of image data deletion processing in the embodiment. In FIG. 11, image data deletion processing is performed when the free capacity of the storage area becomes equal to or smaller than a predetermined value after storing image data in the storage area. FIG. 11 corresponds to step S902 of FIG. 9. Respective steps shown in FIG. 11 are executed by, for example, a CPU 302 of a printing apparatus 300. First, the CPU 302 stores scanned image data in the storage area (step S1101). In step S1101, the image data is also registered in the print data management table shown in FIG. 2. The CPU 302 determines whether the free capacity of the storage area is equal to or smaller than a predetermined value (step S1102). If the CPU 302 determines that the free capacity of the storage area is larger than the predetermined value, the process ends.

If the CPU 302 determines that the free capacity of the storage area is equal to or smaller than the predetermined value, it searches the print data management table for image data having the earliest storage time (step S1103). The CPU 302 determines which of ON and OFF is set in the forced print flag for the image data specified by search (step S1104). If the CPU 302 determines that the forced print flag is OFF, it deletes the image data specified by search (step S1109). After the image data is deleted, the CPU 302 determines whether the free capacity of the storage area is equal to or smaller than the predetermined value (step S1110). If the CPU 302 determines that the free capacity of the storage area is equal to or smaller than the predetermined value, the process returns to step S1103. If the CPU 302 determines that the free capacity of the storage area is larger than the predetermined value, it sets the search completion flag OFF in the print data management table (step S1111).

If the CPU 302 determines in step S1104 that the forced print flag is ON, it determines which of ON and OFF is set in the search completion flag for the image data specified by search (step S1105). If the CPU 302 determines that the search completion flag is OFF, it sets the search completion flag ON for the image data (step S1106). Then, the CPU 302 searches for image data having the second earliest storage time (step S1107), and performs processing in step S1104 for the image data. If the CPU 302 determines in step S1105 that the search completion flag is ON, it searches force-printed image data for image data having the earliest storage time (step S1108). The CPU 302 then deletes the image data (step S1109).

As described above, according to the first to fifth embodiments, when the printing apparatus cannot print in the first state and prints based on print data in the second state different from the first state, it avoids deletion of the print data printed in the second state. The printing apparatus can therefore print again based on the print data in the first state.

As an example in which printing is impossible in the first state, the first to fifth embodiments have described a case in which no designated sheet exists and a case in which a printing material runs short. However, the present invention is not limited to these examples, and is also applicable to a case in which printing is executed in the second state different from the first state.

As an example of a predetermined condition to specify print data to be deleted, the first to fifth embodiments have described a condition that the reception time or storage time is earlier. However, the present invention is not limited to this example, and print data which meets a condition that the data size is larger may be determined as print data to be deleted.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-139859, filed Jun. 23, 2011, which is hereby incorporated by reference herein in its entirety.

What is claimed is:

1. A printing apparatus configured to reprint based on print data after printing based on the print data, comprising:
a printing unit configured to print based on print data of a first print job, and to print based on print data of a second print job, wherein the print data of the second print job is forcibly printed;
a storage unit configured to store the print data of the first print job and the print data of the second print job, after printing of the print data of the first and second print jobs by the printing unit; and
a deletion unit configured to delete the print data of the first print job from the storage unit in priority to the print data of the second print job in accordance with condition for deleting print data stored in the storage unit.

2. The apparatus according to claim 1, wherein the print data of the second print job is forcibly printed in a setting different from a designated setting.

3. The apparatus according to claim 1, wherein the print data of the second print job is forcibly printed in a state in which a printing material is insufficient.

4. The apparatus according to claim 1, wherein the deletion unit deletes older print data of the first print job.

5. The apparatus according to claim 1, wherein the deletion unit deletes the print data of the first print job from the storage unit in priority to the print data of the second print job in a case where a free capacity of the storage unit is not larger than a threshold.

6. A printing apparatus capable of reprinting configured to reprint based on print data stored in a storage unit after printing based on the print data, comprising:
- a capacity determination unit configured to determine whether or not a free capacity of the storage unit is larger than a threshold;
- a first determination unit configured to, in a case where said capacity determination unit determines that the free capacity is not larger than the threshold, determine whether or not print data stored earliest out of print data stored in the storage unit is force-printed data which was force-printed in accordance with a setting different from a designated setting:
- a first deletion unit cured to, in a case where said first determination unit determines that the print data stored earliest is not the force-printed data, delete the print data stored earliest;
- a second determination unit configured to, in a case where said first determination unit determines that the print data stored earliest is the force-printed data, determine whether or not alt print data stored in the stage unit are the force-printed data; and
- a second deletion unit configured to, in a case where said second determination unit determines that all the print data are the force-printed data, delete the print data stored earliest, and in a case where said second determination unit determines that not all the print data are the force-printed data, delete the print data stored earliest out of print data which are not the force-printed data.

7. A data control method to be executed in a printing apparatus configured to reprint based on print data after printing based on the print data, comprising:
- a printing step of, printing based on print data of a first print job, and printing based on print data of a second print job, wherein the print data of the second print job is forcibly printed;
- a storage step of storing the print data of the first print job and the print data of the second print job in a storage unit, after printing of the print data of the first and second print jobs by the printing step; and
- a deletion step of deleting the print data of the first print job from the storage unit in priority to the print data of the second print job in accordance with condition for deleting print data stored in the storage step.

8. The method according to claim 7, wherein the print data at the second print job is forcibly printed in a setting different from a designated setting.

9. The method according to claim 7, wherein the deletion step deletes the print data of the first print job from the storage unit in priority to the print data of the second print job in a case where a free capacity of the storage unit is not larger than a threshold.

10. A data control method to be executed in a printing apparatus configured to reprint based on print data stored in a storage unit after printing based on the print data, comprising:
- a capacity determination step of determining whether or not a free capacity of the storage unit is not larger than a threshold;
- a first determination step of, in a case where the free capacity is determined in the capacity determination step not to be larger than the threshold, determining whether or not print data stored earliest out of print data stored in the storage unit is force-printed data which was force-printed in accordance with a setting different from a designated setting:
- a first deletion step of, in a case where the print data stored earliest is determined in the first determination step not to be the force-printed data, deleting the print data stored earliest;
- a second determination step of, in a case where the print data stored earliest is determined in the first determination step to be the force-printed data, determining whether or not all print data stored in the storage unit are the force-printed data; and
- a second deletion step of, in a case where all the print data are determined in the second determination step to be the force-printed data, deleting the print data stored earliest, and in a case where not all the print data are determined in the second determination step to be the force-printed data, deleting the print data stored earliest out of print data which are not the force-printed data.

11. A non-transitory computer-readable storage medium storing a program for causing a computer to execute
- a printing step of, printing based on print data of a first print job, and printing based on print data of a second print job, wherein the print data of the second print job is forcibly printed:
- a storage step of storing the point data at the first print job and the print data of the second print job in a storage unit, after printing of the print data of the first and second print jobs by the printing step; and
- a deletion step of deleting the print data of the first print job from the storage unit in priority to the print data of the second print job in accordance with condition for deleting print data stored in the storage step.

12. A non-transitory computer-readable storage medium storing a program for causing a computer to execute
- a capacity determination step of determining whether or not a free capacity of a storage unit is not larger than a threshold;
- a first determination step of, in a case where the free capacity is determined in the capacity determination step not to be larger then the threshold, determining whether or not print data stored earliest out of print data stored in the storage unit is force-printed data which was force-printed in accordance with a setting different from a designated setting;
- a first deletion step of, in a case where the print data stored earliest is determined in the first determination step not to be the force-printed data, deleting the print data stored earliest;
- a second determination step of, in a case where the print data stored earliest is determined in the first determination step to be the force-printed data, determining whether or not all print data stored in the storage unit are the force-printed data; and
- a second deletion step of, in a case where all the print data ere determined in the second determination step to be the force-printed data, deleting the print data stored earliest, and in a case where not all the print data are determined in the second determination step to be the force-printed data, deleting the print data stored earliest out of print data which are not the force-printed data.

* * * * *